United States Patent [19]
Ivory

[11] Patent Number: 5,401,051
[45] Date of Patent: Mar. 28, 1995

[54] SUSPENSION ARRANGEMENT

[75] Inventor: Douglas W. Ivory, Wickford, Great Britain

[73] Assignee: Ford Motor Company, Dearborn, Mich.

[21] Appl. No.: 828,943

[22] PCT Filed: Oct. 24, 1990

[86] PCT No.: PCT/GB90/01633
§ 371 Date: Feb. 7, 1992
§ 102(e) Date: Feb. 7, 1992

[87] PCT Pub. No.: WO91/06437
PCT Pub. Date: May 16, 1991

[30] Foreign Application Priority Data
Nov. 4, 1989 [GB] United Kingdom ............... 8924941

[51] Int. Cl.⁶ ............................................. B60G 1/00
[52] U.S. Cl. ................................................ 280/668
[58] Field of Search ............ 280/660, 663, 666, 667, 280/668, 670, 673, 688, 690, 696, 722, 724, 96.1, 47.131, 701

[56] References Cited

U.S. PATENT DOCUMENTS

| | | | |
|---|---|---|---|
| 2,705,647 | 4/1955 | Beck | 280/47.131 |
| 2,836,254 | 5/1958 | Boehner | 280/701 |
| 4,462,608 | 7/1984 | Lederman | 280/668 |
| 4,482,135 | 11/1984 | Ishida et al. | 280/668 |
| 4,497,523 | 2/1985 | Lederman | 280/668 |
| 4,934,730 | 6/1990 | Okuzumi | 280/668 |
| 4,944,524 | 7/1990 | Achenbach | 280/688 |
| 5,074,579 | 12/1991 | Evangelisti | 280/668 |

FOREIGN PATENT DOCUMENTS

| | | |
|---|---|---|
| 60733 | 9/1982 | European Pat. Off. . |
| 65235 | 11/1982 | European Pat. Off. . |
| 729198 | 5/1955 | United Kingdom . |
| 823659 | 11/1959 | United Kingdom . |

Primary Examiner—Stephen P. Avila
Attorney, Agent, or Firm—Raymond L. Coppiellie; Roger L. May

[57] ABSTRACT

In a McPherson strut suspension, the top end of the strut 26 is not positively secured against axial movement in its seat 28 but is prevented from moving from its seat on full extension by abutment of a bracket 44 fixed to the strut with a stop 46 fixed to the chassis.

11 Claims, 2 Drawing Sheets

SUSPENSION ARRANGEMENT

FIELD OF THE INVENTION

This invention relates to a suspension arrangement which includes a McPherson strut. McPherson struts are widely used in motor vehicle suspensions.

DESCRIPTION OF THE PRIOR ART

FIG. 1 shows one standard McPherson strut arrangement where the top end of the strut 2 is received in a seat 4 in the vehicle chassis (usually part of the vehicle bodywork 6). Under normal operating conditions, the weight of the vehicle bodywork is sufficient to ensure that the top end of the strut remains properly positioned in its seat. However at fully extended or 'full hang' positions, there is a possibilty that the top end of the strut may fall out of its seat, and to prevent this happening or to guide the top end of the strut back into its seat when normal operation is resumed, a retaining plate 8 is mounted on the inside of the bodywork and connected to the top end of the strut on the axis of the strut. This axially mounted retaining plate prevents the strut from becoming separated from its seat. However the use of a retaining plate of this nature requires access to the inside of the vehicle during assembly to secure a nut 9, and this is disadvantageous.

SUMMARY OF THE INVENTION

According to the invention, there is provided a suspension arrangement which includes a McPherson strut, wherein the top end of the strut is located from below in a seat in the vehicle chassis, is normally retained in its seat by the weight of the vehicle bodywork, and wherein the strut has a radial projection arranged so that the projection will come into contact with part of the chassis when the strut extends, to define the maximum strut extension, before the top end of the strut is displaced from its seat.

A suspension arrangement of this type has particular advantages during assembly of the vehicle because the suspension can be fitted to the vehicle body operating only from beneath the body. It is not necessary for any operations to take place inside the body.

In one embodiment, the top end of the strut is not anchored to the vehicle bodywork, i.e. no fasteners are used to hold the top end of the strut to the bodywork. When the radial projection contacts the chassis part, a twisting torque will be developed on the strut and this will tend to move the top of the strut sideways. This torque can be resisted by locating the top of the strut within a socket in the underside of the bodywork. Alternatively or additionally, the twisting torque can be resisted by a flange screwed to the underside of the bodywork. It is also possible for the top end of the strut to be held to the bodywork by a frictional engagement produced when the top end of the strut is introduced into a socket from below the vehicle.

For the purposes of this specification, the vehicle chassis includes the vehicle body panels, in particular the body panels to which the suspension components are secured.

The radial projection is preferably angled downwards away from the strut, and the chassis part preferably has a corresponding upward inclination so that when the projection and the cassis part meet, they interlock to a certain extent.

The part of the chassis may be a part of a body cross member which is extended into the path of the radial projection.

Either the radial projection or the part of the chassis may carry a shock-absorbing pad such as a rubber pad.

Preferably the part of the chassis is part of a chassis cross member to which the suspension arms are attached, so that an entire axle assembly consisting of the wheel knuckles, the suspension struts, suspension arms and vehicle cross member can ben pre-assembled and entirely connected to the vehicle simply by securing the cross member to side rails of the chassis.

The invention thus provides a simple way of retaining the top end of the strut without attaching anything to the strut from inside the vehicle.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
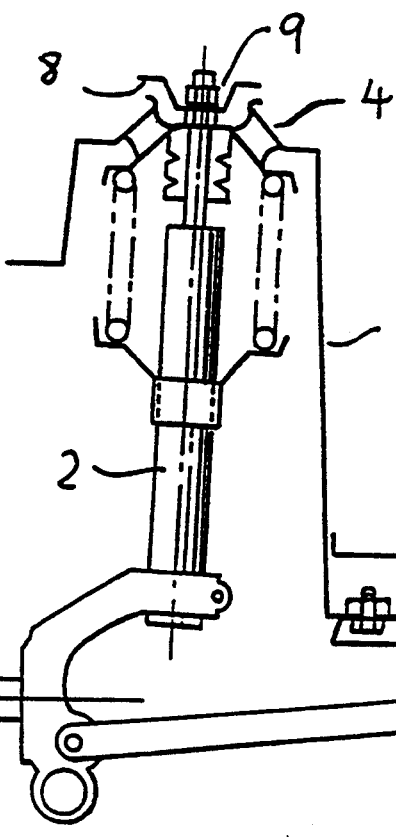
FIG. 1 is a side elevation of a suspension arrangement in accordance with the prior art.
Figure 2:
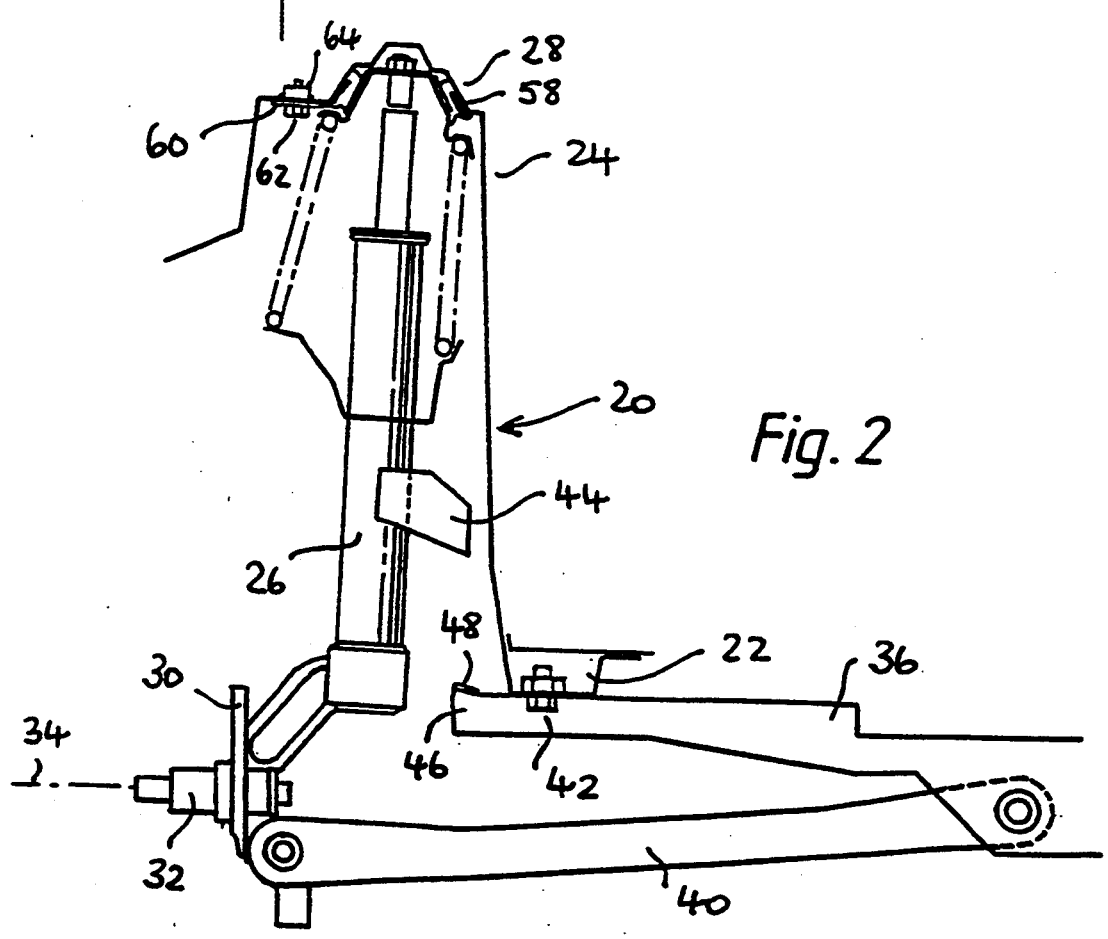
FIG. 2 is a view corresponding to FIG. 1 but showing a suspension arrangement in accordance with the invention.
Figure 3:
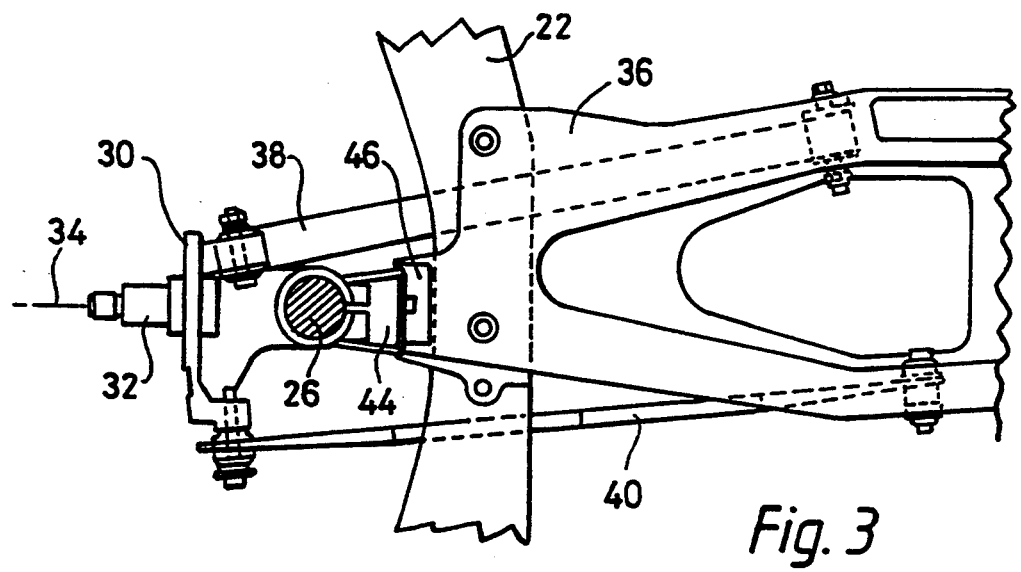
FIG. 3 is a plan view of the arrangement of FIG. 2 taken on the line.

FIG. 2 shows part of the bodywork 20 of a vehicle with a lower side rail 22. There will be a corresponding side rail on the opposite side of the vehicle but this is not shown in the figures. The vehicle bodywork forms a tower 24 into which the top end of the strut 26 extends. At the top of the tower there is a seat 28, and the top end of the strut sits in this seat. Normally the weight of the vehicle bodywork acts downwardly on this seat and loads the strut so that the strut remains located in the seat.

At the bottom end of the strut there is a wheel knuckle 30 with a spindle 32, and the centreline of a wheel to be mounted on the spindle is indicated by the line 34. The knuckle 30 is also connected to a vehicle cross member 36 by two suspension arms 38 and 40. The cross member 36 supports the inner ends of the suspension arms 38, 40 and is secured to the side rail 22 by bolts 42.

The lower part of the strut 26 has a welded-on bracket 44 (see FIGS. 4 and 5) which extends radially outwardly from the axis of the strut. As the strut extends and retracts, so the bracket 44 moves up and down relative to the bodywork 20. Located in the path of movement of the bracket 44, at the lower end of the possible travel of the bracket, is a stop 46 formed by an outward extension of the cross member 36. The stop 46 carries a rubber bumper 48, and it will be seen that when the bracket 44 makes contact with the bumper 48 on the stop 46 the limit of srut extension is reached. Further extension of the strut will be impossible because the strut will be constrained between the seat 28 and the stop 46 which are both fixed in relation to one another. The stop 46 can be easily formed by a small extension of the material of the cross member 36 which itself is formed by a metal pressing.

If the bracket 44 does come into contact with the stop 46, a twisting torque will be exerted on the top of the strut 26, tending to move the strut sideways in the socket 28. This torque is resisted by a component 58 which is moulded into the rubber top mount of the strut and has a radial flange 60. The flange 60 is bolted to the vehicle body from underneath, the bolt 62 being secured in a weld nut 64. This flange is only loaded in its own plane by forces acting in a direction generally at right angles to the strut axis. It is only possible to gain access to the area of the tower 24 at one side of the strut, and so bolts 62 can only be fastened on one side. The component 58 does not therefore play a part in resisting axial movement of the strut out of the socket 28; this movement is resisted by the bracket 44 and stop 46.

Figure 4:
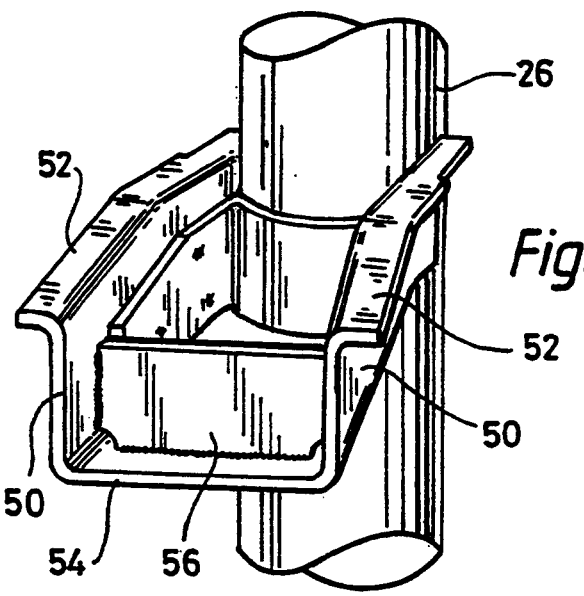
FIG. 4 is a perspective view of the projection on the strut.
Figure 5:
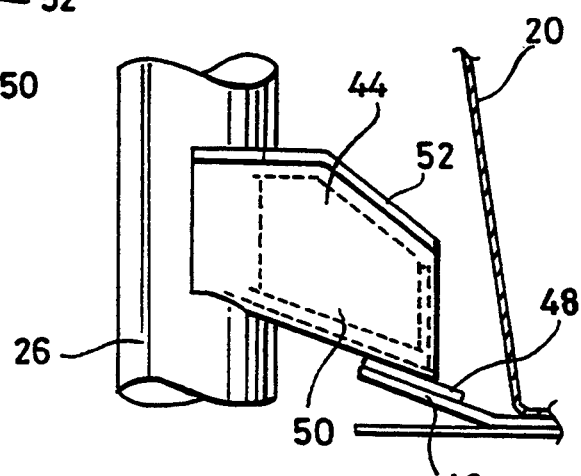
FIG. 5 is a side view of the projection in contact with the chassis member.

The bracket 44 is stamped and folded from sheet metal and is shown in more detail in FIGS. 4 and 5. It has side walls 50, top flanges 52 and a base 54 to provide strength, and the parts of the bracket which make contact with the outer walls of the strut tube are welded to the tube. An inner reinforcement 56 is welded within the walls 50 and the base 54.

In this way, the strut can be secured in the vehicle with its top mount simply push-fitted into the top of the tower 24. Normally the weight of the vehicle will ensure that the strut remains in the seat 28, but at maximum suspension rebound, the strut will still be slightly compressed between the seat 28 and the stop 46, and this compression will be sufficient to retain the top of the strut in the seat.

It is a distinct advantage for assembly, particularly automated assembly, that no operator or tools need be taken inside the car to secure the suspension top mount.

I claim:

1. A suspension arrangement for use in a vehicle having a chassis which includes a McPherson Strut and a suspension arm, wherein the top end of the strut is located from below in a seat in the chassis and is normally retained in its seat by the weight of the vehicle, characterized in that the strut has a radial projection arranged so that the projection will come into contact with part of the chassis when the strut extends, to define the maximum strut extension, before the top end of the strut is displaced from its seat.

2. A suspension arrangement as claimed in claim 1, characterised in that the part of the chassis is a part of a body cross member which is extended into the path of the radial projection.

3. A suspension arrangement as claimed in claim 1 characterised in that no fasteners are used to hold the top end of the strut to the bodywork.

4. A suspension arrangement as claimed in claim 3, characterised in that twisting torque developed on the strut is resisted by locating the top of the strut within a socket in the underside of the bodywork.

5. A suspension arrangement as claimed in claim 3, characterised in that twisting torque is resisted by a plate screwed to the underside of the bodywork.

6. A suspension arrangement as claimed in claim 3, characterised in that top end of the strut is held to the bodywork by a frictional engagement produced when the top end of the strut is introduced into a socket from below the vehicle.

7. A suspension arrangement as claimed in claim 1, characterized in that the radial projection comprises a rubber pad.

8. A suspension arrangement as claimed in claim 1, characterised in that the cooperating faces of the radial projection and the part of the chassis are parallel and inclined to the axis of the strut.

9. A suspension arrangement as claimed in claim 1, characterised in that the part of the chassis is part of a chassis cross member to which the suspension arm attaches.

10. A suspension arrangement for use in a vehicle having a chassis, said suspension arrangement comprising:
   a knuckle;
   a suspension arm pivotally interposed between the chassis and said knuckle;
   a seat in the chassis;
   a McPherson strut wherein a top end of said strut is inserted from below the chassis into said seat and is normally retained in said seat by the weight of the vehicle and a bottom end attached to said knuckle;
   a stop disposed on the chassis;
   a bracket disposed on said strut, said bracket being adapted to contact said stop thereby defining the maximum strut extension to prevent said top end of said strut from displacing from said seat; and
   a plate secured within said seat by a single fastener, said plate having a socket therein to resist twisting torque developed on said strut when said bracket engages said stop.

11. A suspension arrangement as claimed in claim 10, wherein cooperating faces of said bracket and said stop are parallel and inclined to the axis of the strut.

* * * * *